US012294528B2

(12) United States Patent
Beeram et al.

(10) Patent No.: US 12,294,528 B2
(45) Date of Patent: May 6, 2025

(54) RESOURCE RESERVATION PROTOCOL RESOURCE NOTIFICATION MESSAGES

(71) Applicant: Juniper Networks, Inc., Sunnyvale, CA (US)

(72) Inventors: Vishnu Pavan Beeram, Hyderabad (IN); Chandrasekar Ramachandran, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/343,598

(22) Filed: Jun. 28, 2023

(65) Prior Publication Data

US 2024/0305582 A1 Sep. 12, 2024

(30) Foreign Application Priority Data

Mar. 10, 2023 (IN) .............................. 202341016014

(51) Int. Cl.
*H04L 47/72* (2022.01)
*H04L 47/70* (2022.01)

(52) U.S. Cl.
CPC ............ *H04L 47/72* (2013.01); *H04L 47/825* (2013.01)

(58) Field of Classification Search
CPC .............................. H04L 47/72; H04L 47/825
See application file for complete search history.

(56) References Cited

U.S. PATENT DOCUMENTS

| 8,472,346 | B1 * | 6/2013 | Bahadur | H04L 45/28 |
| | | | | 370/254 |
| 10,237,173 | B2 * | 3/2019 | Nainar | H04L 45/26 |
| 2007/0165515 | A1 * | 7/2007 | Vasseur | H04L 45/12 |
| | | | | 370/216 |
| 2010/0214913 | A1 * | 8/2010 | Kompella | H04L 47/70 |
| | | | | 370/230 |
| 2016/0308786 | A1 | 10/2016 | Chen et al. | |
| 2020/0351188 | A1 * | 11/2020 | Arora | H04L 45/50 |
| 2022/0094638 | A1 * | 3/2022 | Dutta | H04L 45/302 |

OTHER PUBLICATIONS

Extended European Search Report for Application No. EP23194025, mailed on Mar. 11, 2024, 9 pages.

* cited by examiner

*Primary Examiner* — Mohamed A. Wasel
*Assistant Examiner* — Jihad K Boustany
(74) *Attorney, Agent, or Firm* — Harrity & Harrity, LLP

(57) ABSTRACT

In some implementations, a non-ingress node of one or more label-switched paths (LSPs) may identify a resource issue event. The non-ingress node may identify, based on identifying the resource issue event, one or more notification-requester stacks included in a data structure. The non-ingress node may generate one or more resource notification messages that each include a respective notification-requester stack of the one or more notification-requester stacks. The non-ingress node may send the one or more resource notification messages based on the one or more notification-requester stacks.

20 Claims, 9 Drawing Sheets

RESOURCE RESERVATION PROTOCOL RESOURCE NOTIFICATION MESSAGES

CROSS-REFERENCE TO RELATED APPLICATION

This Patent Application claims priority to India Patent Application Ser. No. 202341016014, filed on Mar. 10, 2023, and entitled "RESOURCE RESERVATION PROTOCOL RESOURCE NOTIFICATIONS." The disclosure of the prior Application is considered part of and is incorporated by reference into this Patent Application.

BACKGROUND

The resource reservation protocol (RSVP) is a transport layer protocol designed to reserve resources across a network using an integrated services model. The RSVP operates over Internet protocol (IP) version 4 (IPv4) or IP version 6 (IPv6) and provides receiver-initiated setup of resource reservations for multicast or unicast data flows. A label-switched path (LSP) is a path through a multiprotocol label switching (MPLS) network set up by a signaling protocol, such as the RSVP. An LSP typically includes an ingress node, one or more transit nodes, and an egress node.

SUMMARY

In some implementations, a method includes identifying, by a non-ingress node of one or more LSPs, a resource issue event; identifying, by the non-ingress node and based on identifying the resource issue event, one or more notification-requester stacks included in a data structure; generating, by the non-ingress node, one or more resource notification messages that each include a respective notification-requester stack of the one or more notification-requester stacks; and sending, by the non-ingress node, the one or more resource notification messages based on the one or more notification-requester stacks.

In some implementations, a non-transitory computer-readable medium storing a set of instructions includes one or more instructions that, when executed by one or more processors of an ingress node of one or more LSPs, cause the ingress node to: send, to at least one other node, a message that includes resource notification request information, wherein the resource notification request information includes a notification-requester stack, and a top position of the notification-requester stack identifies the ingress node; and receive, after sending the message, a resource notification message that identifies a non-ingress node associated with at least one LSP, of the one or more LSPs, and a resource issue event.

In some implementations, a non-ingress node of one or more LSPs includes one or more memories; and one or more processors to: identify a resource issue event; generate, based on identifying the resource issue event, one or more resource notification messages that each include a respective notification-requester stack of the one or more notification-requester stacks; and send the one or more resource notification messages based on the one or more notification-requester stacks.

DETAILED DESCRIPTION

Figure 1A:
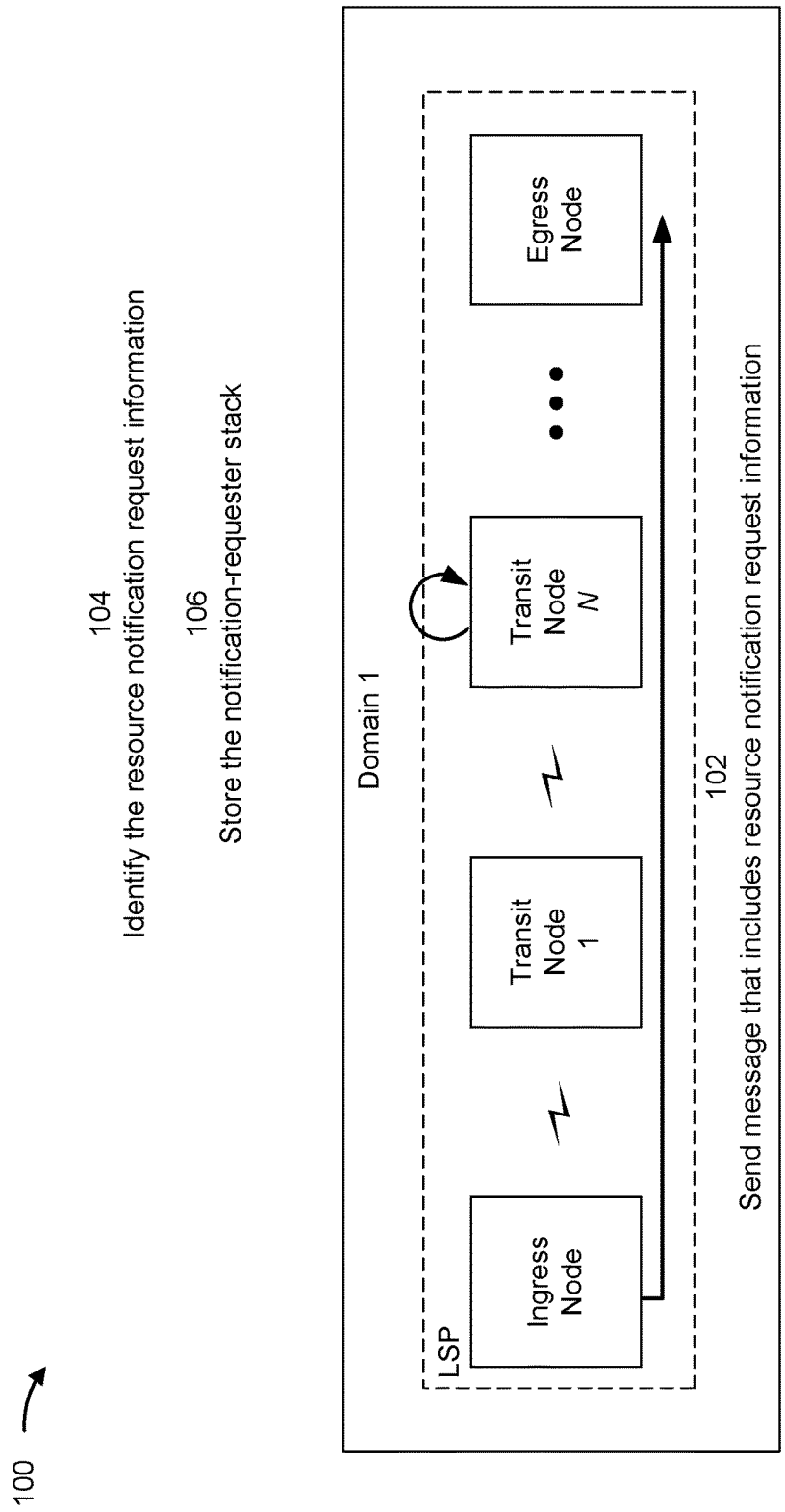
FIGS. 1A-1D are diagrams of an example implementation associated with resource notification messages.

The following detailed description of example implementations refers to the accompanying drawings. The same reference numbers in different drawings may identify the same or similar elements.

A non-ingress node of an LSP can generate and send, to an ingress node of the LSP, an RSVP error message (also referred to as an RSVP PathErr message) that indicates that the non-ingress node has detected a resource issue event associated with the non-ingress node (e.g., a link of the non-ingress node is no longer available or a bandwidth associated with the link has changed). In response, the ingress node can adjust a resource request associated with the LSP, or act to cause the LSP to be terminated and a new LSP to be established that avoids the non-ingress node. This helps to ensure that network resources are used efficiently and that data flows associated with the LSPs are delivered reliably and with minimal delay.

However, the non-ingress node generates an RSVP error message for each LSP with which the non-ingress node is associated. In many cases, the non-ingress node may be associated with numerous (e.g., hundreds, thousands, or more) LSPs that have a same ingress node. Consequently, numerous copies of the RSVP error message may be sent (e.g., hop-by-hop) to the ingress node (e.g., one for each LSP), which is sometimes referred to as an RSVP error message storm (or an RSVP PathErr message storm). This consumes computing resources (e.g., processing resources, memory resources, communication resources, and/or power resources, among other examples) of the non-ingress node, ingress node, and any in-between transit nodes, that support generating, forwarding, and processing of the numerous copies of the RSVP error messages. In some cases, this can negatively affect network performance, such as by increasing latency, reducing throughput, increasing delay, and/or reducing bandwidth.

Some implementations described herein provide a plurality of nodes (e.g., network nodes, such as servers, routers, switches, and/or other network nodes) that are associated with a network. The plurality of nodes may associate with a plurality of LSPs, where each LSP includes an ingress node, one or more transit nodes, and an egress node.

An ingress node of an LSP may send resource notification request information to one or more non-ingress nodes of the LSP (e.g., one or more transit nodes and an egress node of the LSP). For example, the ingress node may include the resource notification request information (e.g., as an object) in a message, such as an LSP set-up message (e.g., an RSVP path message), and may send the message to the one or more non-ingress nodes to cause the LSP to be established. The resource notification request information may indicate that the ingress node is able to receive and process a resource notification message (further described herein) from a non-ingress node. In this way, each node of the LSP may be informed that the ingress node supports resource notification messages.

In some implementations, the resource notification request information may include a notification-requester stack, and the ingress node may include an identifier of the ingress node (e.g., a universal unique identifier (UUID), or another type of identifier) in a top position of the notification-requester stack. When the LSP is an inter-domain LSP, the message may be forwarded to a non-ingress node of the inter-domain LSP that is a border node (e.g., a node associated with multiple domains of the inter-domain LSP). Accordingly, the non-ingress node may include an identifier of the non-ingress node in the top position of the notification-requester stack (and thereby push the identifier of the ingress node down a position in the notification-requester stack) before the non-ingress node forwards the message to one or more other non-ingress nodes of the inter-domain LSP. In this way, the notification-requester stack is modified to indicate, for a non-ingress node that receives the message, the ingress node and any border nodes between the ingress node and the non-ingress node.

In some implementations, a node that is a non-ingress node of an LSP (and a non-ingress node of one or more other LSPs) may include a data structure (e.g., a database, a table, a file, and/or another type of data structure). The non-ingress node may store a notification-requester stack in the data structure (e.g., based on receiving a message that includes the notification-requester stack). The non-ingress node may store additional LSP information in association with the resource notification request information, such as information identifying the LSP and/or characteristics of the LSP (e.g., a bandwidth used by the LSP). In some implementations, the non-ingress node may store multiple notification-requester stacks in the data structure, wherein each notification-requester stack is different (e.g., each notification-requester stack is unique), and may store information identifying LSPs and/or characteristics of the LSPs that are associated with each notification-requester stack.

In some implementations, a non-ingress node of one or more LSPs may identify a resource issue event associated with the non-ingress node, such as a resource unavailable event (e.g., a link of the non-ingress node is no longer available) or a resource degraded event (e.g., a bandwidth associated with the link has changed, such as due to a sub-link no longer being available or a bandwidth capability of the link having been modified). Accordingly, based on identifying the resource issue event, the non-ingress node may generate one or more resource notification messages. For example, the non-ingress node may generate a resource notification message for each notification-requester stack included in the data structure of the non-ingress node. The resource notification message may identify the non-ingress node and the resource issue event (e.g., the resource unavailable event or the resource degraded event). In some implementations, when the resource issue event is the resource degraded event, each resource notification message may indicate additional resource information, such as a bandwidth reduction recommendation (e.g., an amount of bandwidth that needs to be reduced) for LSPs associated with a notification-requester stack that is associated with the resource notification message.

The non-ingress node then may send a resource notification message to each node in the top positions of the notification-requester stacks. For example, when the node is a non-ingress node that is associated with one or more intra-domain LSPs, the node may send a resource notification message (e.g., that identifies the non-ingress node and the resource issue event, and, optionally, additional resource information) to an ingress node (e.g., that is in a top position of a notification-requester stack) of the one or more intra-domain LSPs. As another example, when the node is a non-ingress node that is associated with one or more inter-domain LSPs, the node may send a resource notification message to a transit node that is also a border node (e.g., that is in a top position of a notification-requester stack) of the one or more inter-domain LSPs. The transit node, based on the resource notification message, then may forward the message (e.g., based on the notification-requester stack), which allows the resource notification message to be received by an ingress node of the one or more inter-domain LSPs. In this way, the resource notification message may be forwarded to the ingress node via multiple domains, wherein no one node in the LSP is configured to identify a path of the LSP across more than two domains.

In some implementations, an ingress node of one or more LSPs may receive a resource notification message (e.g., that indicates a non-ingress node of the one or more LSPs that generated the resource notification message, the resource issue event, and, optionally, additional resource information). Accordingly, when the resource event is a resource unavailable event, the ingress node may cause the one or more LSPs associated with the non-ingress node to be terminated. The ingress node then may perform one or more processing steps to cause one or more replacement LSPs to be established (e.g., that do not include the non-ingress node). Alternatively, when the resource event is a resource degraded event, the ingress node may cause a set of the one or more LSPs associated with the non-ingress node to be modified or terminated (e.g., based on the additional resource information included in the resource notification message).

In this way, some implementations described herein allow a non-ingress node of a plurality of LSPs to identify a resource issue event and to generate and send, to each ingress node associated with the plurality of LSPs, an individual resource notification message that indicates the resource issue event. In this way, the non-ingress node does not need to generate and send an RSVP error message for each of the plurality of LSPs. Accordingly, when a quantity of ingress nodes of the plurality of LSPs is less than a quantity of the LSPs, fewer resource notification messages need to be sent (e.g., as compared to RSVP error messages that would otherwise need to be sent). Therefore, less computing resources (e.g., processing resources, memory resources, communication resources, and/or power resources, among other examples) are consumed by the non-ingress node, the ingress node, and any in-between transit nodes, to support generating, forwarding, and processing of the resource notification messages. Some implementations described herein can also prevent messaging storms because a quantity of resource notification messages that need to be generated and provided in association with the LSPs may be substantially less than (e.g., less than or equal to 10% of) a number of the plurality of LSPs. This therefore improves network performance, such as by reducing latency, increasing throughput, reducing delay, and/or increasing bandwidth (e.g., as compared to providing support for generating, forwarding, and processing of numerous copies of RSVP error messages).

FIGS. 1A-1D are diagrams of an example implementation 100 associated with resource notification messages. As shown in FIGS. 1A-1D, example implementation 100 includes a plurality of nodes, such as an ingress node, one or more transit nodes, and an egress node. These devices are described in more detail below in connection with FIGS. 2-4. Any node that is not an ingress node (e.g., the node is a transit node or an egress node) may be referred to as a non-ingress node.

Figure 1B:
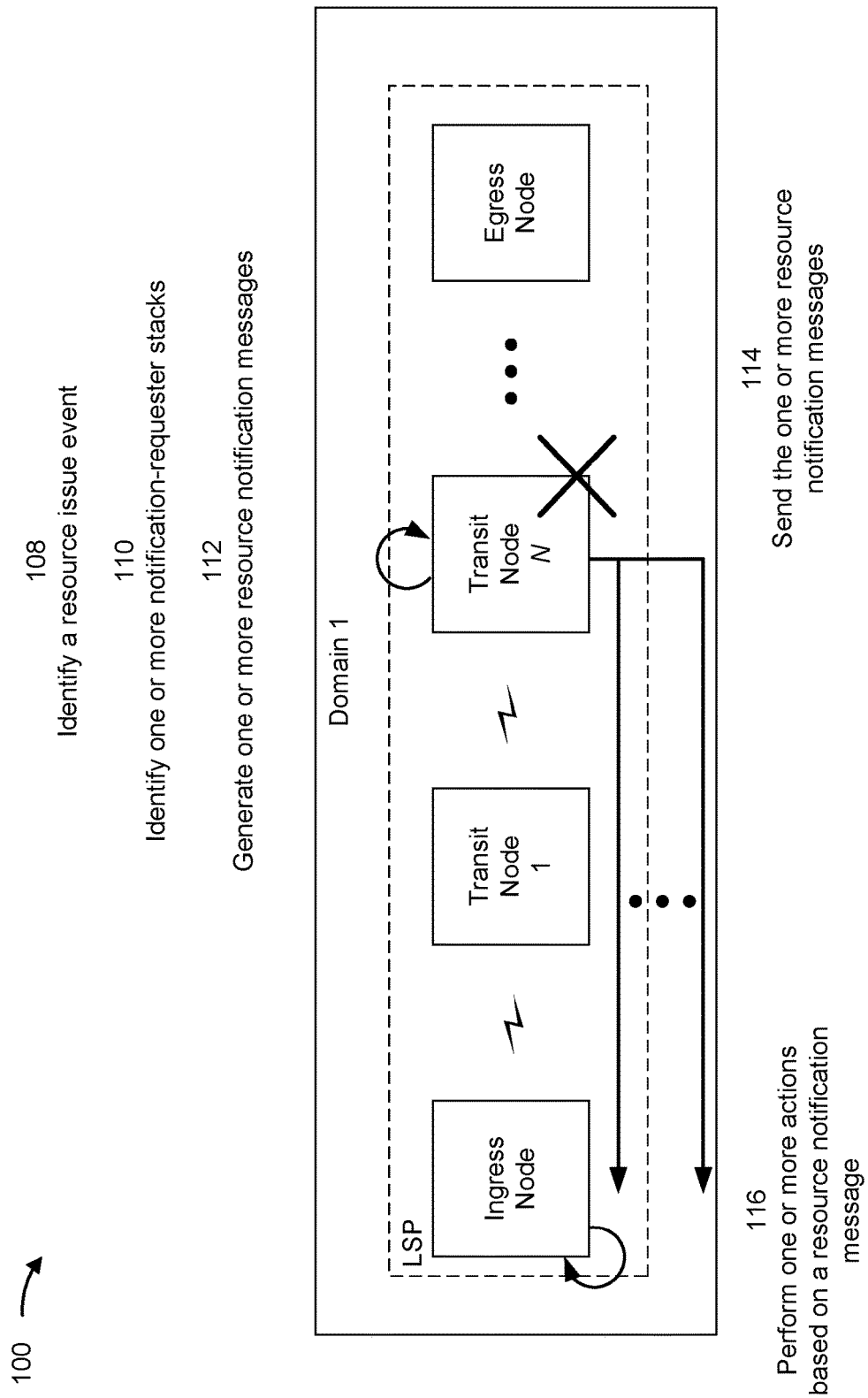
Figure 1C:
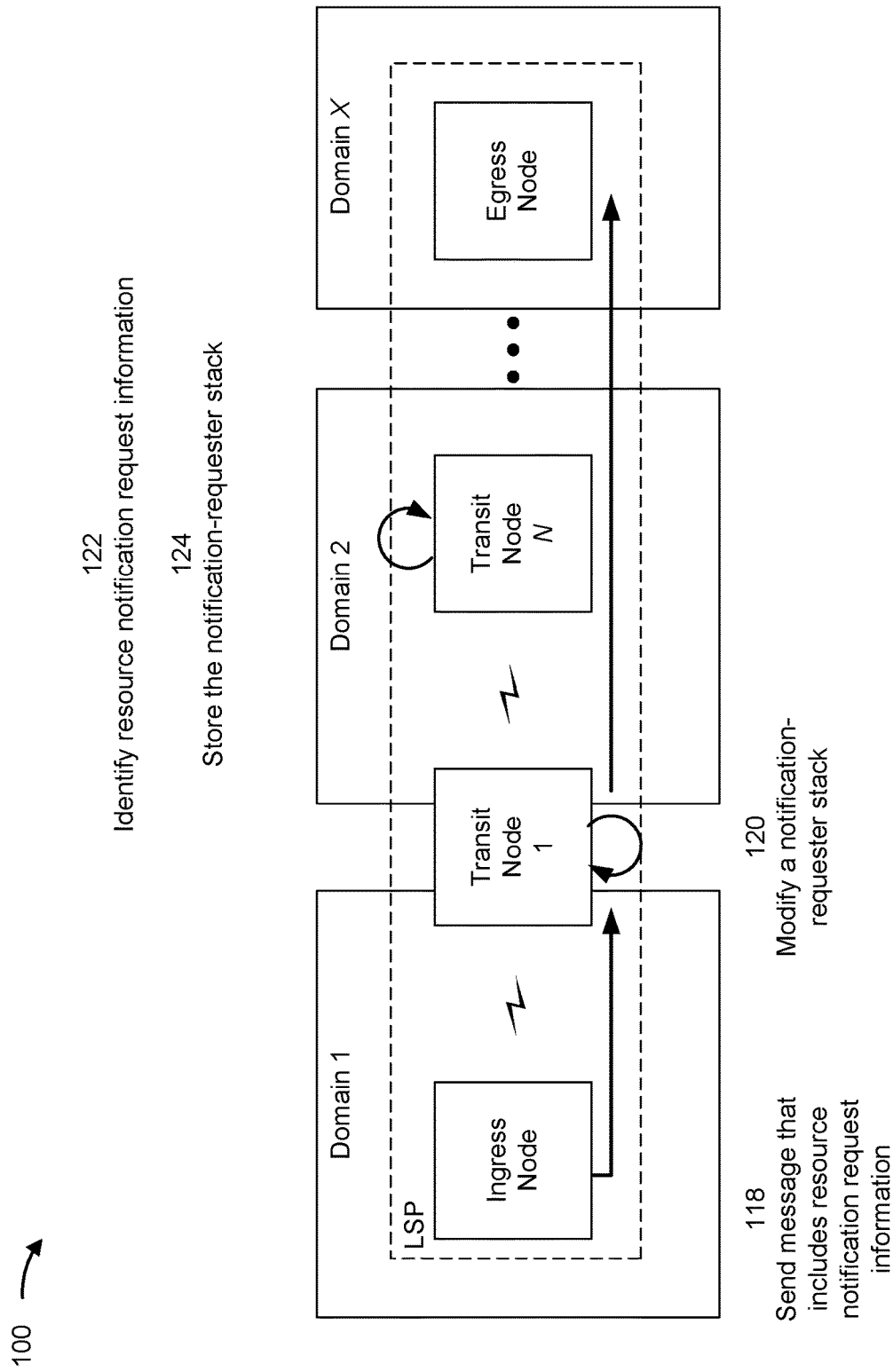
Figure 1D:
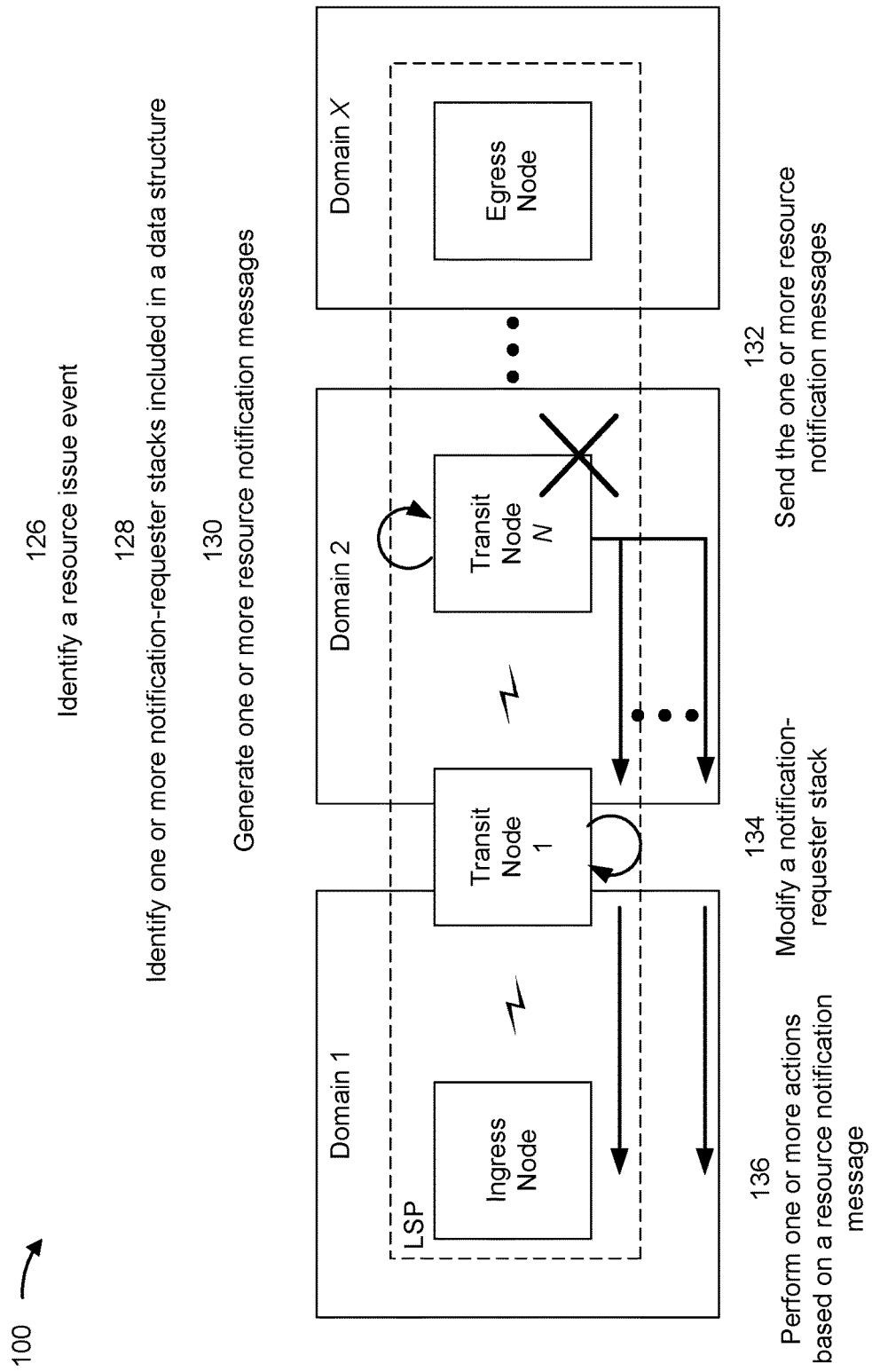

An LSP from an ingress node to an egress node may include one or more transit nodes. For example, as shown in FIGS. 1A-1D, an LSP from an ingress node to an egress node may include a transit node 1 and a transit node N (e.g., with one or more additional transit nodes between transit node 1 and the transit node N and/or between the transit node N and the egress node). As shown in FIGS. 1A-1B, an LSP may be included in a single domain (shown as Domain 1) and may therefore be referred to as an intra-domain LSP. Alternatively, as shown in FIGS. 1C-1D, an LSP may span multiple domains (e.g., shown as Domains 1, 2, and X (e.g., where X≥2) and may therefore be referred to as an inter-domain LSP. Further, although not shown in FIGS. 1A-1D, a transit node, such as transit node N, and the ingress node may be associated with one or more LSPs (e.g., may be included in one or more different LSPs). Each LSP may be, for example, an MPLS LSP, an RSVP MPLS LSP, or another type of LSP.

As shown in FIG. 1A, and by reference number 102, the ingress node may send a message. For example, the ingress node may send the message to the one or more transit nodes and the egress node in the LSP shown in FIG. 1A (e.g., within the Domain 1). The ingress node may send the message to the transit node 1 to cause the message to propagate, via the LSP, to one or more other transit nodes (e.g., including the transit node N) and the egress node.

In some implementations, the message may include resource notification information. The resource notification information may indicate that the ingress node is able to receive and process a resource notification message (e.g., as further described herein) from a non-ingress node (e.g., any of the one or more transit nodes and the egress node in the LSP). In some implementations, the resource notification information includes a notification-requester stack, where a top position of the notification-requester stack identifies the ingress node (e.g., as an originator of the resource notification information). For example, the notification-requester stack may include a label, a UUID, an address, or another type of identifier of the ingress node in the top position of the notification-requester stack.

In some implementations, the message may be an LSP set-up message (e.g., an RSVP path message, sometimes referred to as a PATH message) to establish the LSP, and the resource notification request information may be included in the LSP set-up message (e.g., as an object). Accordingly, the message may also include LSP information, such as information identifying the LSP and/or information identifying characteristics of the LSP (e.g., a bandwidth to be used by the LSP). The ingress node may therefore send the message to the one or more transit nodes and the egress node to cause the LSP to be established (e.g., in accordance with the LSP information), and to indicate to the one or more transit nodes and the egress node that the ingress node is able to receive and process resource notification messages.

In this way, a non-ingress node, such as the transit node N, that is associated with an LSP, may receive a message that includes notification request information from an ingress node associated with the LSP. Accordingly, when the non-ingress node is associated with one or more or more LSPs, the non-ingress node may receive a similar message from ingress nodes associated with the one or more LSPs (e.g., when the ingress nodes support receiving and processing resource notification messages).

As shown by reference number 104, the non-ingress node of the LSP (shown as the transit node N) may identify resource notification request information of the message that the non-ingress node received from the ingress node of the LSP. For example, the non-ingress node may process (e.g., parse and/or read) the message to identify the resource notification request information. The non-ingress node may therefore identify the notification-requester stack (e.g., where the top position of the notification-requester stack identifies the ingress node) that is included in the resource notification request information of the message.

Accordingly, as shown by reference number 106, the non-ingress node may store the notification-requester stack. For example, the non-ingress node may include, and/or may have access to, a data structure (e.g., a database, a table, a file, and/or another type of data structure), and may cause the data structure to store the notification-requester stack. In this way, the non-ingress node may cause the data structure to store the notification-requester stack as part of one or more notification-requester stacks included in the data structure. Further, the non-ingress node may store, in association with the notification-requester stack, the LSP information (e.g., when the message also includes the LSP information). For example, the non-ingress node may cause the data structure to store the notification-requester stack and the LSP information in a same entry of the data structure.

In some implementations, when the data structure already includes the notification-requester stack (e.g., because the non-ingress node already stored the notification-requester stack based on previously receiving a message with notification request information that included the notification-requester stack), the non-ingress node may not cause the data structure to store the notification-requester stack (e.g., because the notification-requester stack is already present in the data structure). In this way, the non-ingress node may allow the data structure to store only unique notification-requester stacks (e.g., as opposed to multiple copies of notification-requester stacks). Even so, the non-ingress node may cause the data structure to store the LSP information in association with the notification-requester stack (e.g., that is already present in the data structure). For example, the non-ingress node may cause the data structure to store the LSP information in an entry of the data structure that includes the structure notification-requester stack (and that may include other respective LSP information associated with one or more other LSPs).

As shown in FIG. 1B, and by reference number 108, the non-ingress node (shown as the transit node N) may identify a resource issue event (e.g., after receiving the message and/or storing the notification-requester stack). In some implementations, the non-ingress node may monitor a performance (e.g., a routing performance) of the non-ingress node, and may, based on monitoring the non-ingress node, identify a resource issue event. The resource issue event may be, for example, a resource unavailable event (e.g., a link of the non-ingress node is not available or no longer available) or a resource degraded event (e.g., bandwidth associated with a link has changed, such as due to a sub-link not being available or no longer being available, or due to a bandwidth capability of the link having been modified).

As shown by reference number 110, the non-ingress node may identify one or more notification-requester stacks (e.g., based on identifying the resource issue event). For example, the non-ingress node may identify one or more notification-requester stacks in the data structure (e.g., that is included in, and/or accessible to, the non-ingress node) that the non-ingress node caused to be stored in the data structure (e.g., as a result of receiving the message described herein in relation to FIG. 1A, and, optionally, one or more other similar messages). That is, the non-ingress node may be associated with one or more LSPs, and the non-ingress node may identify one or more notification-requester stacks in the data structure that are associated with the one or more LSPs (e.g., where each notification-requester stack is associated with at least one LSP of the one or more LSPs).

As shown by reference number 112, the non-ingress node may generate one or more resource notification messages (e.g., based on identifying the resource issue event and/or based on identifying the one or more notification-requester stacks). Each resource notification message may identify the non-ingress node and the resource issue event. In some implementations, the non-ingress node may generate a resource notification message for each notification-requester stack of the one or more notification-requester stacks. Further, the non-ingress node may generate each resource notification message to include a respective notification-requester stack of the one or more notification-requester stacks. In this way, each resource notification message is associated with at least one LSP of the one or more LSPs with which the non-ingress node is associated.

In some implementations, such as when the resource issue event is a resource degraded event, a resource notification message, of the one or more resource notification messages, may indicate a bandwidth reduction recommendation (e.g., for at least one LSP with which the resource notification message is associated). For example, the non-ingress node may determine, based on the resource issue event, a reduction in available bandwidth for the one or more LSPs with which the non-ingress node is associated. The non-ingress node may thereby determine (e.g., based on the LSP information associated with each notification-requester stack included in the data structure), a bandwidth reduction recommendation for each notification-requester stack. Accordingly, the non-ingress node may generate a resource notification message for a notification-requester stack (e.g., by including the notification-requester stack in the resource notification message), such that the resource notification message indicates a bandwidth reduction recommendation that the non-ingress node determined for the notification-requester stack. In some implementations, the non-ingress node may determine that a bandwidth reduction recommendation is zero (0) (e.g., indicating no bandwidth reduction recommendation) for a notification request stack, and may therefore generate a resource notification message for the notification-requester that does not include the bandwidth reduction recommendation.

As shown by reference number 114, the non-ingress node may send the one or more resource notification messages (e.g., based on the one or more notification-requester stacks). For example, the non-ingress node may identify, for a resource notification message, another node (e.g., that is not the non-ingress node) that is associated with a top position of a notification-requester stack (e.g., that is included in the resource notification message and/or that is associated with the resource notification message) and may send the resource notification to the other node. Accordingly, as shown in FIG. 1B, when the notification-requester stack is associated with at least one LSP that includes an ingress node and the non-ingress node in a same domain (e.g., the Domain 1), the other node may be the ingress node (e.g., the ingress node may be associated with the top position of the notification-requester stack). The non-ingress node may send other resource notification messages, of the one or more resource notification messages, in a similar manner (and/or in a manner further described herein in relation to FIG. 1D).

Accordingly, as shown in FIG. 1B, an ingress node associated with at least one LSP, of the one or more LSPs with which the non-ingress node is associated, may receive a resource notification message from the non-ingress node. As shown by reference number 116, the ingress node may perform one or more actions (e.g., based on the resource notification message received by the ingress node). In some implementations, the one or more actions may include initiating a termination operation for an LSP and/or initiating an establishment operation for a new LSP (e.g., as a replacement LSP).

For example, the ingress node may identify a particular LSP of the at least one LSP (e.g., based on the resource notification message, such as when the resource notification message indicates a resource unavailable event), and may cause a termination operation associated with the particular LSP to be initiated. Additionally, or alternatively, the ingress node may cause an establishment operation for a new LSP to be initiated (e.g., where the non-ingress node is not included in the new LSP). The ingress node may perform similar operations for each LSP of the at least one LSP to ensure that the ingress node is not thereafter associated with any LSP that includes the non-ingress node.

As another example, the ingress node may identify a particular LSP of the at least one LSP (e.g., based on the resource notification message, such as when the resource notification message indicates a resource degraded event and a bandwidth reduction recommendation), and may cause a termination operation associated with the particular LSP to be initiated. Additionally, or alternatively, the ingress node may cause an establishment operation for a new LSP to be initiated (e.g., where the non-ingress node is node is not included in the new LSP, once established). The ingress node may perform similar operations for each LSP of the at least one LSP to ensure that the ingress node is not thereafter associated with any LSP that includes the non-ingress node. Alternatively, the ingress node may perform similar operations for a set of LSPs of the at least one LSP to ensure that the bandwidth reduction recommendation is satisfied (e.g., initiation of termination of at least some, but not all, LSPs, and initiation of corresponding new LSPs) to ensure that a total bandwidth of LSPs that includes the non-ingress node is reduced (e.g., in accordance with the bandwidth reduction recommendation).

As described above, an LSP may span multiple domains (and may therefore be an inter-domain LSP). For example, as shown in FIGS. 1C-1D, an LSP may span Domains 1, 2, and X, where an ingress node of the LSP is included in the Domain 1, a transit node 1 is a border node (e.g., an autonomous system boundary router (ASBR) node or an area border router (ABR) node) that is included in the Domain 1 and the Domain 2, a transit node N is included in the Domain 2, and the egress node is included in the Domain X. This may affect how messages propagate to nodes within the LSP, as further described herein.

As shown in FIG. 1C, and by reference number 118, the ingress node may send a message, such as in a similar manner as that described herein in relation to FIG. 1A and reference number 102. For example, the ingress node may send the message to the one or more transit nodes and the egress node in the LSP shown in FIG. 1C (e.g., across the Domains 1, 2, and X). The ingress node may send the message to the transit node 1 to cause the message to propagate, via the LSP, to one or more other transit nodes (e.g., including the transit node N) and the egress node. The message may include resource notification information (e.g., that indicates that the ingress node is able to receive and process a resource notification message), which may include a notification-requester stack (e.g., where a top position of the notification-requester stack identifies the ingress node), and may also include LSP information.

As shown by reference number 120, the transit node 1 may receive the message and, because the transit node 1 is a border transit node, may modify the notification-requester stack in resource notification information included in the message. For example, the transit node 1 may modify the notification-requester stack, such that the top position of the notification-requester stack identifies the transit node 1. That is, the transit node 1 may "push" a label, a UUID, an address, or another type of identifier, of the transit node 1 onto the notification-requester stack (e.g., in the top position of the notification-requester stack), which causes a bottom position of the notification-requester stack to identify the ingress node. The transit node 1 then may forward the message to a next-hop in the LSP, such as the transit node N shown in FIG. 1C.

The notification-requester stack may therefore be a first-in, last-out (FILO) queue, where each border transit node of the LSP that receives the message modifies the notification-requester stack to cause the top position to identify the border node. In this way, a non-ingress node, such as the transit node N, that is associated with the LSP, may receive a message that comprises notification request information, which includes a notification-requester stack that identifies (e.g., as a FILO queue) one or more border transit nodes of the LSP (e.g., that are along the LSP from the ingress node to the non-ingress node) and the ingress node.

As shown by reference number 122, the non-ingress node of the LSP (shown as the transit node N) may identify the resource notification request information of the message (e.g., that the non-ingress node received from the ingress node of the LSP via one or more border transit nodes). For example, the non-ingress node may process (e.g., parse and/or read) the message to identify the resource notification request information. The non-ingress node may therefore identify the notification-requester stack (e.g., where the top position of the notification-requester stack identifies a border transit node that is included in the same domain as the non-ingress node, and a bottom position of the notification-requester stack identifies the ingress node, which is included in a different domain) that is included in the resource notification request information of the message.

Accordingly, as shown by reference number 124, the non-ingress node may store the notification-requester stack (e.g., in a similar manner as that described herein in relation to FIG. 1A and reference number 106). For example, the non-ingress node may include, and/or may have access to, a data structure, and may cause the data structure to store the notification-requester stack. In this way, the non-ingress node may cause the data structure to store the notification-requester stack as part of one or more notification-requester stacks included in the data structure. Further, the non-ingress node may store, in association with the notification-requester stack, the LSP information (e.g., when the message also includes the LSP information). For example, the non-ingress node may cause the data structure to store the notification-requester stack and the LSP information in a same entry of the data structure.

In some implementations, when the data structure already includes the notification-requester stack (e.g., because the non-ingress node already stored the notification-requester stack based on previously receiving a message with notification request information that included the notification-requester stack), the non-ingress node may not cause the data structure to store the notification-requester stack (e.g., because the notification-requester stack is already present in the data structure). In this way, the non-ingress node may allow the data structure to store only unique notification-requester stacks (e.g., as opposed to multiple copies of notification-requester stacks). Even so, the non-ingress node may cause the data structure to store the LSP information in association with the notification-requester stack (e.g., that is already present in the data structure). For example, the non-ingress node may cause the data structure to store the LSP information in an entry of the data that includes the structure notification-requester stack (and that may include other respective LSP information associated with one or more other LSPs).

As shown in FIG. 1D, and by reference number 126, the non-ingress node (shown as the transit node N) may identify a resource issue event (e.g., after receiving the message and/or storing the notification-requester stack), such as in a similar manner as that described herein in relation to FIG. 1B and reference number 108. The resource issue event may be, for example, a resource unavailable event or a resource degraded event.

As shown by reference number 128, the non-ingress node may identify one or more notification-requester stacks (e.g., based on identifying the resource issue event), such as in a similar manner as that described herein in relation to FIG. 1B and reference number 110. For example, the non-ingress node may identify one or more notification-requester stacks in the data structure (e.g., that is included in, and/or accessible to, the non-ingress node) that the non-ingress node caused to be stored in the data structure (e.g., as a result of receiving the message described herein in relation to FIG. 1C, and, optionally, one or more other similar messages). That is, the non-ingress node may be associated with one or more LSPs, and the non-ingress node may identify one or more notification-requester stacks in the data structure that are associated with the one or more LSPs (e.g., where each notification-requester stack is associated with at least one LSP of the one or more LSPs).

As shown by reference number 130, the non-ingress node may generate one or more resource notification messages (e.g., based on identifying the resource issue event and/or based on identifying the one or more notification-requester stacks), such as in a similar manner as that described herein in relation to FIG. 1A and reference number 112. Each resource notification message may identify the non-ingress node and the resource issue event. In some implementations, the non-ingress node may generate a resource notification message for each notification-requester stack of the one or more notification-requester stacks. Further, the non-ingress node may generate each resource notification message to include a respective notification-requester stack of the one or more notification-requester stacks. In this way, each resource notification message is associated with at least one LSP of the one or more LSPs with which the non-ingress node is associated.

In some implementations, such as when the resource issue event is a resource degraded event, a resource notification message, of the one or more resource notification messages, may indicate a bandwidth reduction recommendation (e.g., for at least one LSP with which the resource notification message is associated). In some implementations, the non-ingress node may determine that a bandwidth reduction recommendation is zero (0) (e.g., indicating no bandwidth reduction recommendation) for a notification-requester stack, and may therefore generate a resource notification message for the notification-requester stack that does not include the bandwidth reduction recommendation.

As shown by reference number 132, the non-ingress node may send the one or more resource notification messages (e.g., based on the one or more notification-requester stacks). For example, the non-ingress node may identify, for a resource notification message, another node (e.g., that is not the non-ingress node) that is associated with a top position of a notification-requester stack (e.g., that is included in the resource notification message and/or that is associated with the resource notification message) and may send the resource notification to the other node. Accordingly, as shown in FIG. 1D, when the notification-requester stack is associated with at least one LSP that includes an ingress node and the non-ingress node, which are in different domains (e.g., the Domain 1 and the Domain 2), the other node may be a border transit node (e.g., the transit node 1, which may be associated with the top position of the notification-requester stack). The non-ingress node may send other resource notification messages, of the one or more resource notification messages, in a similar manner (and/or in a manner described herein in relation to FIG. 1B).

As shown by reference number 134, the transit node 1 may receive the resource notification message and, because the transit node 1 is a border transit node, may modify the notification-requester stack in the resource notification message. For example, the transit node 1 may modify the notification-requester stack, such that the top position of the notification-requester stack identifies another node (e.g., the ingress node or another border transit node). That is, the transit node 1 may "pop" (e.g., remove) the label, the UUID, the address, or the type of identifier, of the transit node 1 from the notification-requester stack, which causes a label, a UUID, an address, or another type of identifier, of the other node to be in the top position of the notification-requester stack. The transit node 1 then may identify the other node that is associated with the top position of the notification-requester stack and may send the resource notification to the other node (e.g., the ingress node or another transit border node).

Accordingly, as shown in FIG. 1D, the ingress node associated with at least one LSP, of the one or more LSPs with which the non-ingress node is associated, may receive a resource notification message from the non-ingress node (e.g., via one or more transit border nodes). As shown by reference number 136, the ingress node may perform one or more actions (e.g., based on the resource notification message received by the ingress node), such as in a similar manner as that described herein in relation to FIG. 1B and reference number 116. In some implementations, the one or more actions include initiating a termination operation for an LSP and/or initiating an establishment operation for a new LSP (e.g., as a replacement LSP). For example, the ingress node may identify a particular LSP of the at least one LSP (e.g., based on the resource notification message), and may cause a termination operation associated with the particular LSP to be initiated. Additionally, or alternatively, the non-ingress node may cause an establishment operation for a new LSP to be initiated (e.g., where the non-ingress node is not included in the new LSP).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
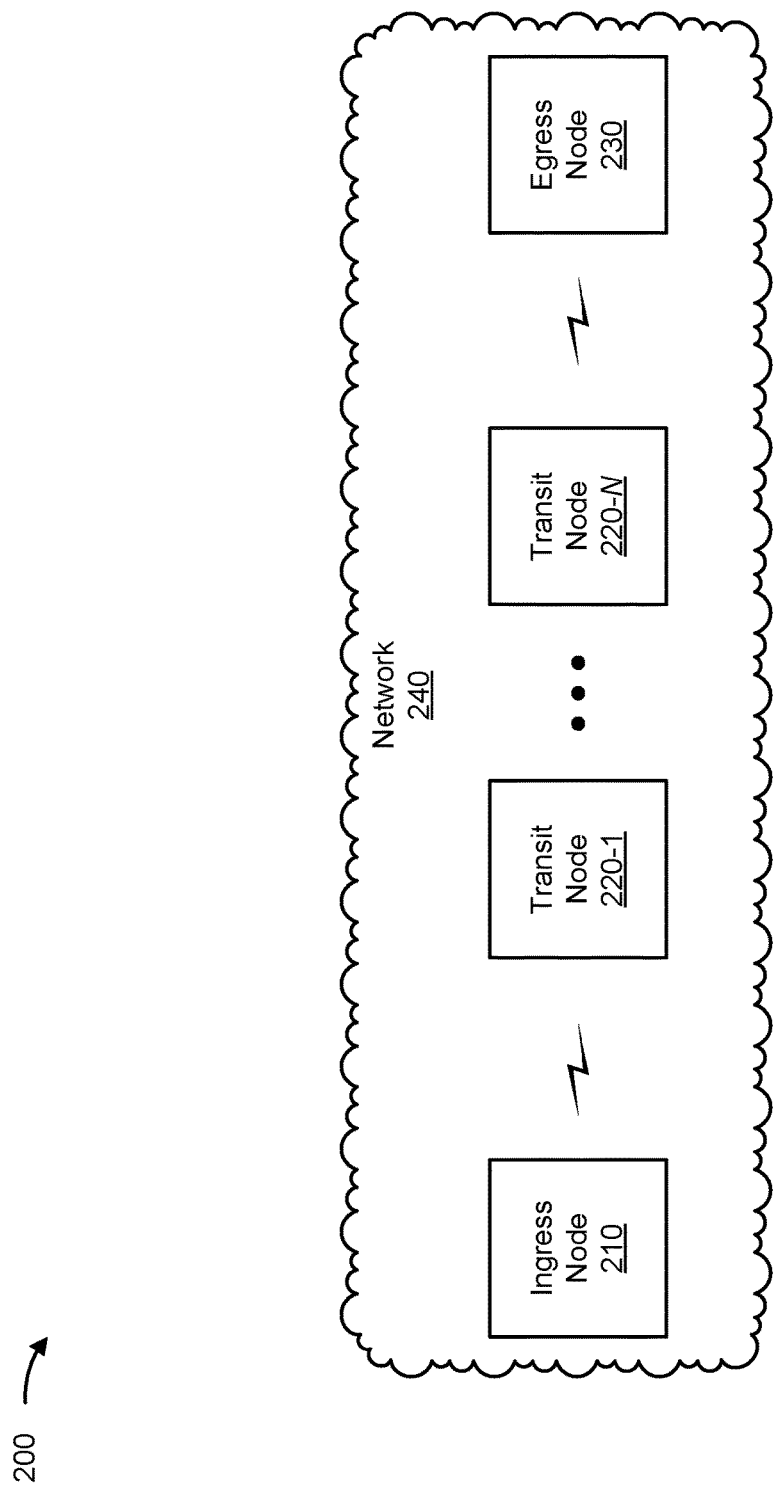
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an ingress node 210, a group of transit nodes 220 (shown as transit node 220-1 through transit node 220-N), an egress node 230, and a network 240. Devices of environment 200 may interconnect via wired connections, wireless connections, or a combination of wired and wireless connections. The ingress node 210, the group of transit nodes 220, and the egress node 230 may be included in an LSP (e.g., in an intradomain LSP or an inter-domain LSP) in the network 240.

Ingress node 210 includes one or more devices capable of receiving, generating, storing, processing, and/or providing information, such as information described herein. For example, ingress node 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, ingress node 210 may receive network traffic from and/or may provide network traffic to other ingress nodes 210 and/or egress node 230, via network 240 (e.g., by routing packets via the LSP, using transit nodes 220 as intermediaries).

Each transit node 220 of the group of transit nodes 220 includes one or more devices capable of receiving, processing, storing, routing, and/or providing traffic (e.g., a packet or other information or metadata) in a manner described herein. For example, transit node 220 may include a router, such as a label switching router (LSR), a label edge router (LER), an ingress router, an egress router, a provider router (e.g., a provider edge router or a provider core router), a virtual router, or another type of router. Additionally, or alternatively, transit node 220 may include a gateway, a switch, a firewall, a hub, a bridge, a reverse proxy, a server (e.g., a proxy server, a cloud server, or a data center server), a load balancer, and/or a similar device. In some implementations, transit node 220 may be a physical device implemented within a housing, such as a chassis. In some implementations, transit node 220 may be a virtual device implemented by one or more computer devices of a cloud computing environment or a data center. In some implementations, a group of transit nodes 220 may be a group of data center nodes that are used to route traffic flow through network 240.

Egress node 230 includes one or more devices capable of receiving, generating, storing, processing, and/or providing information, such as information described herein. For example, egress node 230 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, egress node 230 may receive network traffic from and/or may provide network traffic to other ingress nodes 210 and/or egress node 230, via network 240 (e.g., by routing packets via the LSP, using transit nodes 220 as intermediaries).

Network 240 includes one or more wired and/or wireless networks. For example, network 240 may include an MPLS network, an RSVP MPLS network, a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
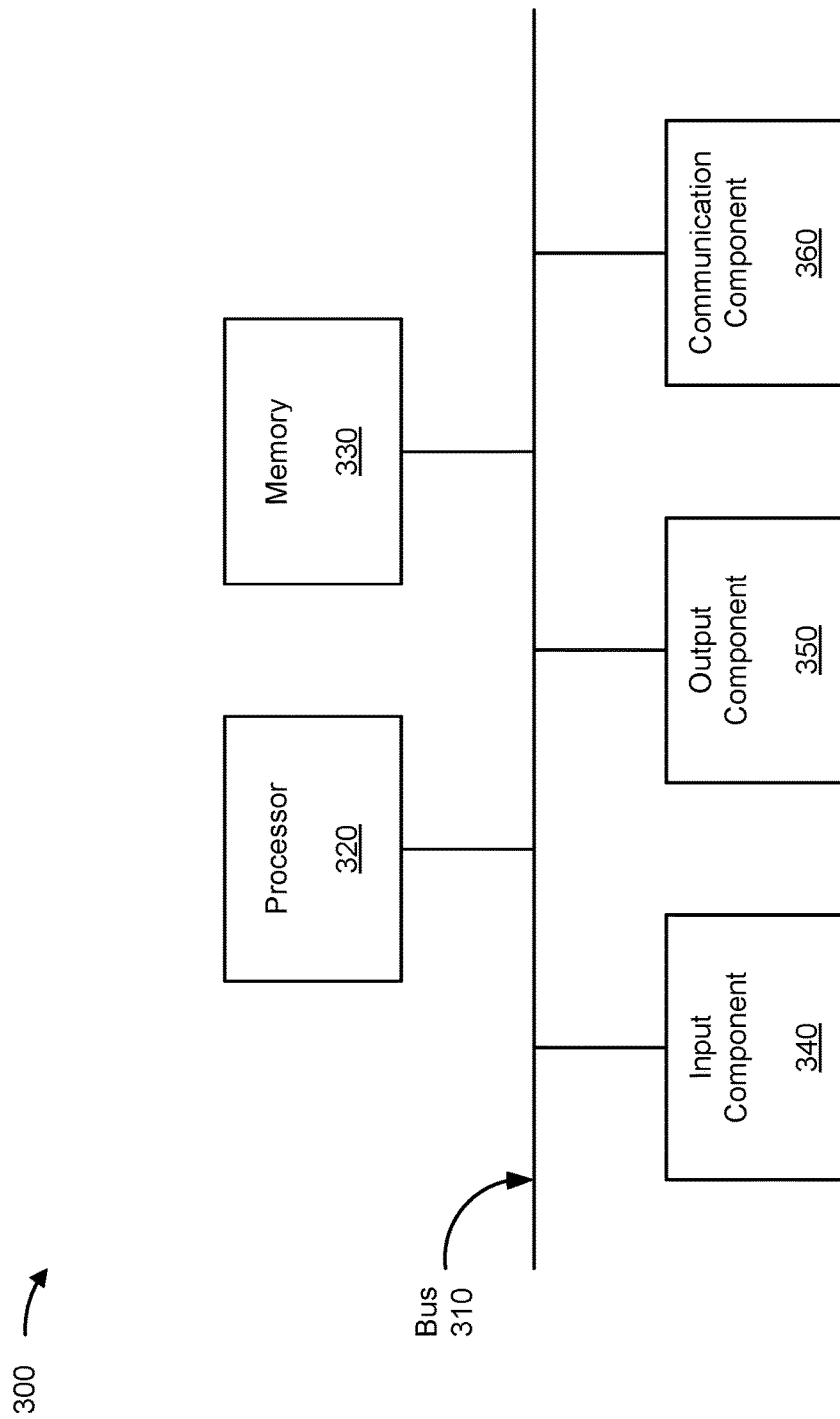
FIG. 3 is a diagram of example components of a device associated with resource notification messages.

FIG. 3 is a diagram of example components of a device 300 associated with resource notification messages. The device 300 may correspond to ingress node 210, transit node 220, and/or egress node 230. In some implementations, ingress node 210, transit node 220, and/or egress node 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
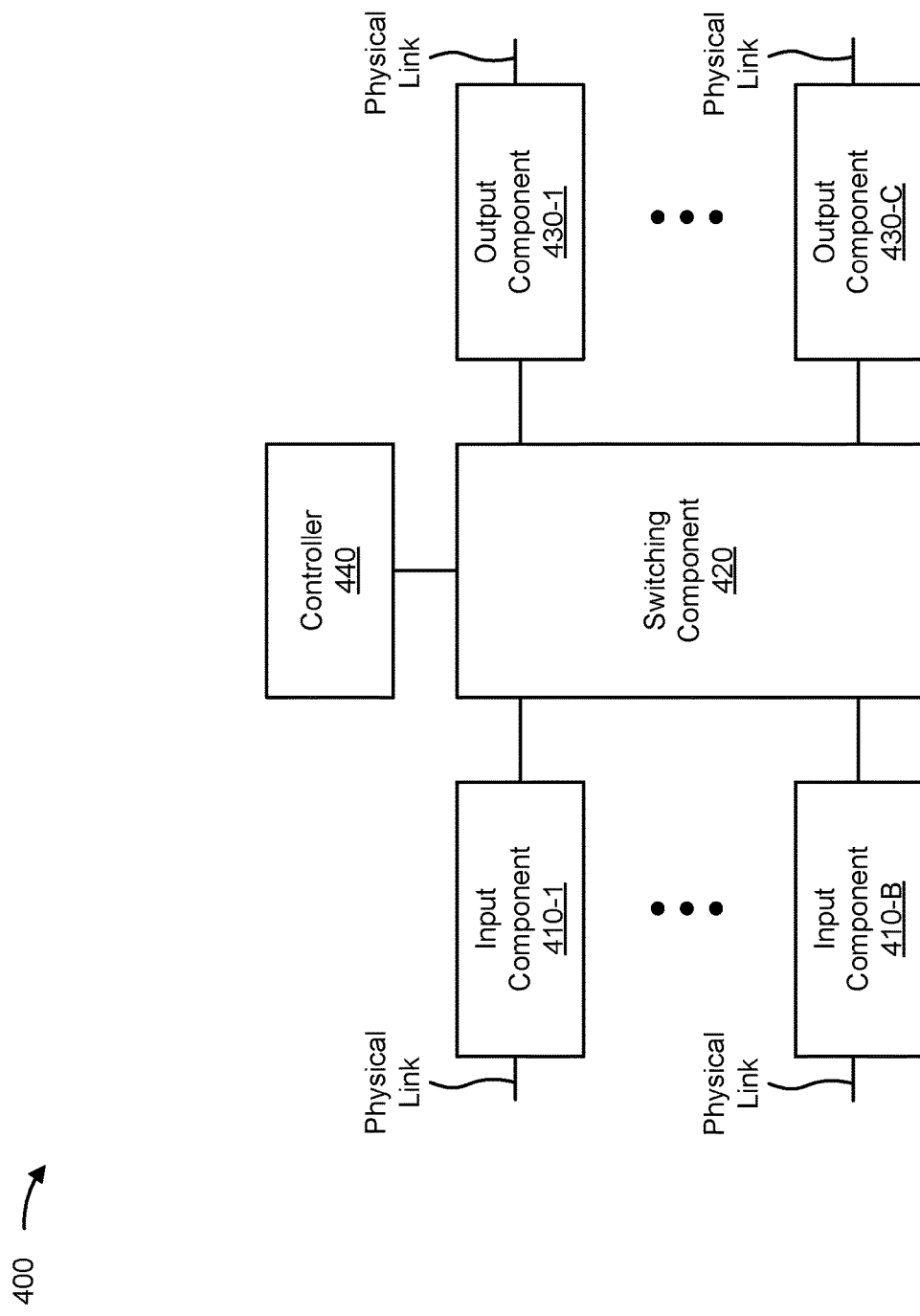
FIG. 4 is a diagram of example components of a device associated with resource notification messages.

FIG. 4 is a diagram of example components of a device 400 associated with resource notification messages. Device 400 may correspond to ingress node 210, transit node 220, and/or egress node 230. In some implementations, ingress node 210, transit node 220, and/or egress node 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
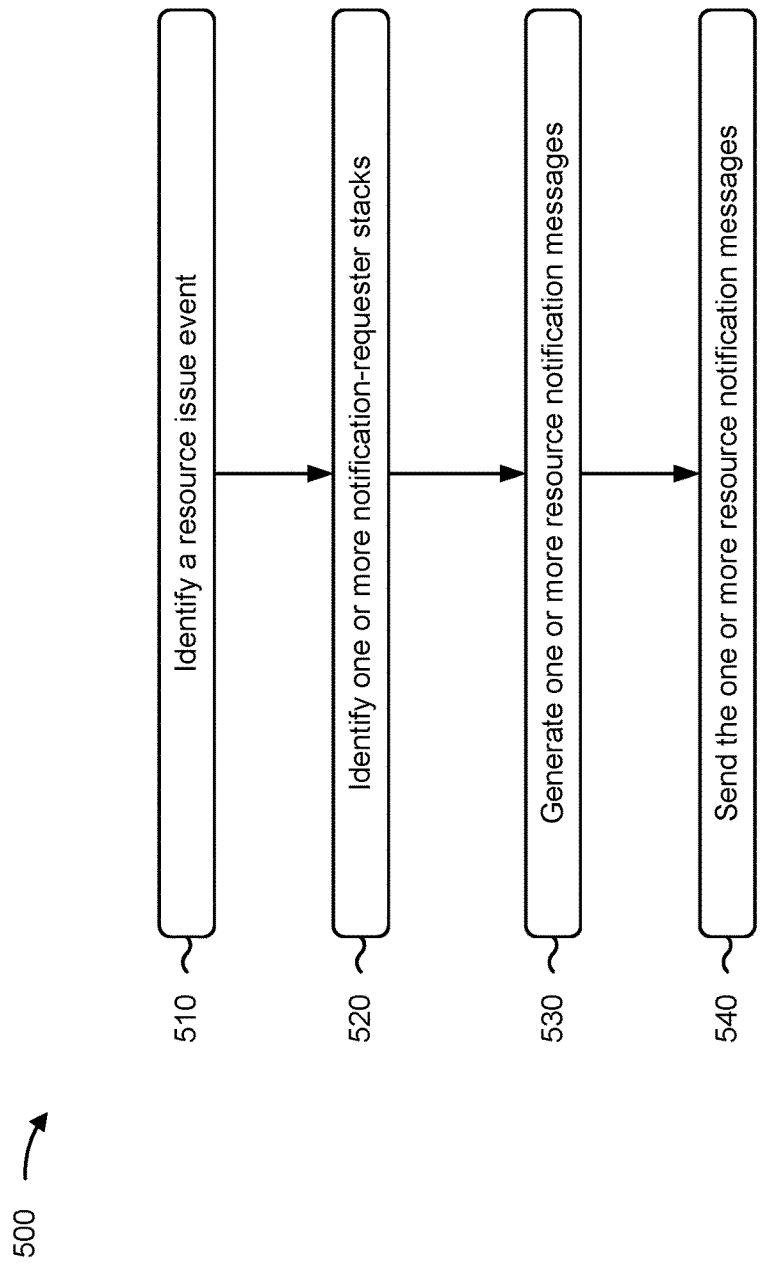
FIG. 5 is a flowchart of an example process associated with resource notification messages.

FIG. 5 is a flowchart of an example process 500 associated with resource notification messages. In some implementations, one or more process blocks of FIG. 5 are performed by a non-ingress node (e.g., transit node 220 or egress node 230) of one or more LSPs. In some implementations, one or more process blocks of FIG. 5 are performed by another device or a group of devices separate from or including the transit node, such as an ingress node (e.g., ingress node 210), another non-ingress node (e.g., another transit node 220 or egress node 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 5, process 500 may include identifying a resource issue event (block 510). For example, the non-ingress node may identify a resource issue event, as described above.

As further shown in FIG. 5, process 500 may include identifying one or more notification-requester stacks (block 520). For example, the non-ingress node may identify, based on identifying the resource issue event, one or more notification-requester stacks included in a data structure, as described above.

As further shown in FIG. 5, process 500 may include generating one or more resource notification messages (block 530). For example, the non-ingress node may generate one or more resource notification messages, as described above. Each resource notification message may include a respective notification-requester stack of the one or more notification-requester stacks.

As further shown in FIG. 5, process 500 may include sending the one or more resource notification (block 540). For example, the non-ingress node may send the one or more resource notification messages based on the one or more notification-requester stacks, as described above.

Process 500 may include additional implementations, such as any single implementation or any combination of implementations described below and/or in connection with one or more other processes described elsewhere herein.

In a first implementation, the resource issue event is one of a resource unavailable event, or a resource degraded event.

In a second implementation, alone or in combination with the first implementation, each resource notification message identifies the non-ingress node and the resource issue event.

In a third implementation, alone or in combination with one or more of the first and second implementations, each resource notification message indicates a bandwidth reduction recommendation for at least one LSP, of the one or more LSPs, associated with the non-ingress node.

In a fourth implementation, alone or in combination with one or more of the first through third implementations, sending the one or more resource notification messages comprises identifying, for each resource notification message, another node associated with a top position of a notification-requester stack, of the one or more notification-requester stacks, that is included in the resource notification message, and sending the resource notification message to the other node.

In a fifth implementation, alone or in combination with one or more of the first through fourth implementations, the other node is an ingress node that is associated with at least one LSP of the one or more LSPs.

In a sixth implementation, alone or in combination with one or more of the first through fifth implementations, the other node is another non-ingress node that is associated with at least one LSP of the one or more LSPs.

In a seventh implementation, alone or in combination with one or more of the first through sixth implementations, process 500 includes receiving, prior to identifying the resource issue event, a message, that originated from an ingress node that is associated with at least one LSP of the one or more LSPs, that includes resource notification request information; identifying a notification-requester stack included in the resource notification request information of the message; and causing the data structure to store the notification-requester stack as part of the one or more notification-requester stacks included in the data structure.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
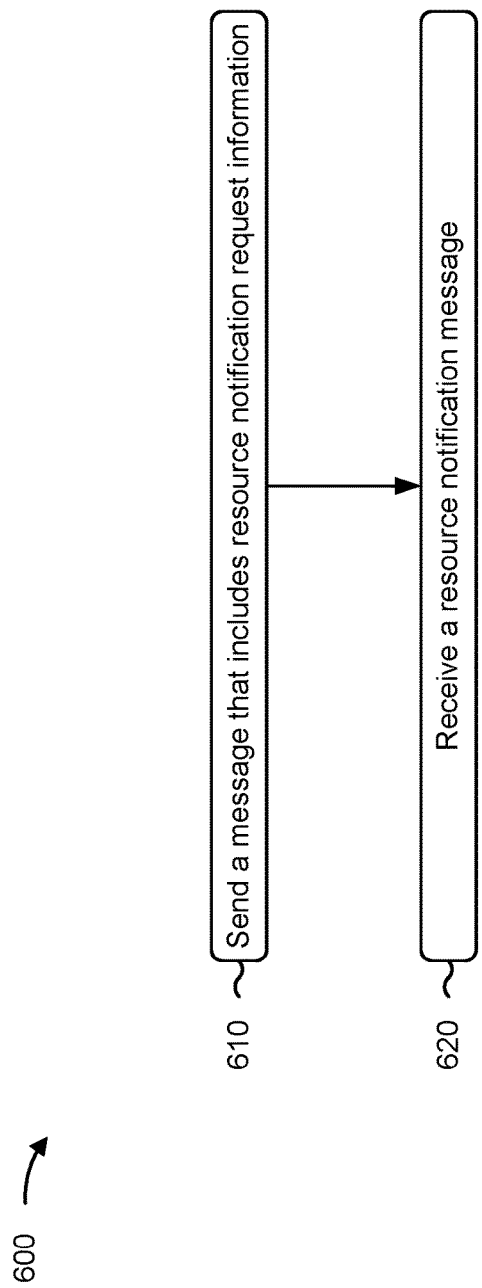
FIG. 6 is a flowchart of an example process associated with resource notification messages.

FIG. 6 is a flowchart of an example process 600 associated with resource notification messages. In some implementations, one or more process blocks of FIG. 6 are performed by an ingress node (e.g., ingress node 210) of one or more LSPs. In some implementations, one or more process blocks of FIG. 6 are performed by another device or a group of devices separate from or including the ingress node, such as a non-ingress node (e.g., transit node 220 or egress node 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 6, process 600 may include sending a message that includes resource notification request information (block 610). For example, the ingress node may send, to at least one other node, a message that includes resource notification request information, as described above. In some implementations, the resource notification request information includes a notification-requester stack, wherein a top position of the notification-requester stack identifies the ingress node.

As further shown in FIG. 6, process 600 may include receiving a resource notification message (block 620). For example, the ingress node may receive, after sending the message, a resource notification message, as described above. The resource notification message may identify a non-ingress node associated with at least one LSP, of the one or more LSPs, and a resource issue event.

Process 600 may include additional implementations, such as any single implementation or any combination of implementations described below and/or in connection with one or more other processes described elsewhere herein.

In a first implementation, the resource issue event is one of a resource unavailable event, or a resource degraded event.

In a second implementation, alone or in combination with the first implementation, sending the message allows the message to be routed to the non-ingress node via a particular other node of the at least one other node, wherein the particular other node modifies the notification-requester stack, such that the top position of the notification-requester stack identifies the particular other node.

In a third implementation, alone or in combination with one or more of the first and second implementations, process 600 includes identifying, based on the resource notification message, a particular LSP of the at least one LSP; causing, based on identifying the particular LSP, a termination operation associated with the particular LSP to be initiated; and causing, based on identifying the particular LSP, an establishment operation for a new LSP to be initiated.

In a fourth implementation, alone or in combination with one or more of the first through third implementations, the non-ingress node is not included in the new LSP.

In a fifth implementation, alone or in combination with one or more of the first through fourth implementations, process 600 includes identifying a bandwidth reduction recommendation included in the resource notification message; causing, based on the bandwidth reduction recommendation, a termination operation associated with a particular LSP, of the at least one LSP, to be initiated; and causing, based on the bandwidth reduction recommendation, an establishment operation for a new LSP to be initiated.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. "Packet" may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a non-ingress node of one or more label-switched paths (LSPs), resource notification request information that includes a notification-requester stack, wherein the notification-requester stack includes an identifier of an ingress node in a top position of the notification-requester stack;
   identifying, by the non-ingress node, a resource issue event;
   identifying, by the non-ingress node and based on identifying the resource issue event, one or more notification-requester stacks, that include the notification-requester stack, and that is included in a data structure;
   generating, by the non-ingress node, one or more resource notification messages that each include a respective notification-requester stack of the one or more notification-requester stacks; and
   sending, by the non-ingress node and to each node in top positions of the one or more notification-requester stacks, the one or more resource notification messages.

2. The method of claim 1, wherein the resource issue event is one of:
   a resource unavailable event, or
   a resource degraded event.

3. The method of claim 1, wherein each resource notification message identifies the non-ingress node and the resource issue event.

4. The method of claim 3, wherein each resource notification message indicates a bandwidth reduction recommendation for at least one LSP, of the one or more LSPs, associated with the non-ingress node.

5. The method of claim 1, wherein the ingress node is associated with at least one LSP of the one or more LSPs.

6. The method of claim 1, further comprising:
   receiving, by the non-ingress node, prior to identifying the resource issue event, a message, that originated from the ingress node, that includes resource notification request information,
     wherein the ingress node is associated with at least one LSP of the one or more LSPs;
   identifying, by the non-ingress node, the notification-requester stack included in the resource notification request information of the message; and
   causing, by the non-ingress node, the data structure to store the notification-requester stack as part of the one or more notification-requester stacks included in the data structure.

7. A non-transitory computer-readable medium storing a set of instructions, the set of instructions comprising:
   one or more instructions that, when executed by one or more processors of an ingress node of one or more label-switched paths (LSPs), cause the ingress node to:
   send, to at least one other node, a message that includes resource notification request information,
     wherein the resource notification request information includes a notification-requester stack, and a top position of the notification-requester stack includes an identifier of the ingress node;

receive, after sending the message, a resource notification message that identifies a non-ingress node associated with at least one LSP, of the one or more LSPs, and a resource issue event associated with the non-ingress node,
wherein the resource notification message is received based on identifying the ingress node based on the identifier included in a top position of the notification-requester stack;
identify a resource issue event;
identify, based on identifying the resource issue event, one or more notification-requester stacks, that include the notification-requester stack, and that is included in a data structure; and
generate, based on identifying the resource issue event, one or more resource notification messages that each include a respective notification-requester stack of the one or more notification-requester stacks.

8. The non-transitory computer-readable medium of claim 7, wherein the resource issue event is one of:
a resource unavailable event, or
a resource degraded event.

9. The non-transitory computer-readable medium of claim 7, wherein sending the message allows the message to be routed to the non-ingress node via a particular other node of the at least one other node,
wherein the particular other node modifies the notification-requester stack, such that the top position of the notification-requester stack identifies the particular other node.

10. The non-transitory computer-readable medium of claim 7, wherein the one or more instructions, when executed by the one or more processors, further cause the ingress node to:
identify, based on the resource notification message, a particular LSP of the at least one LSP;
cause, based on identifying the particular LSP, a termination operation associated with the particular LSP to be initiated; and
cause, based on identifying the particular LSP, an establishment operation for a new LSP to be initiated.

11. The non-transitory computer-readable medium of claim 10, wherein the non-ingress node is not included in the new LSP.

12. The non-transitory computer-readable medium of claim 7, wherein the one or more instructions, when executed by the one or more processors, further cause the ingress node to:
identify a bandwidth reduction recommendation included in the resource notification message;
cause, based on the bandwidth reduction recommendation, a termination operation associated with a particular LSP, of the at least one LSP, to be initiated; and
cause, based on the bandwidth reduction recommendation, an establishment operation for a new LSP to be initiated.

13. A non-ingress node of one or more label-switched paths (LSPs), comprising:
one or more memories; and
one or more processors to:
receive resource notification request information that includes a notification-requester stack,
wherein the notification-requester stack includes an identifier of an ingress node in a top position of the notification-requester stack;
identify a resource issue event;
identify, based on identifying the resource issue event, one or more notification-requester stacks, that include the notification-requester stack, and that is included in a data structure;
generate, based on identifying the resource issue event, one or more resource notification messages that each include a respective notification-requester stack of the one or more notification-requester stacks; and
send, to each node in top positions of the respective notification-requester stack of the one or more notification-requester stacks, the one or more resource notification messages based on the one or more notification-requester stacks.

14. The non-ingress node of claim 13, wherein each resource notification message identifies the non-ingress node and the resource issue event.

15. The non-ingress node of claim 13, wherein a resource notification message, of the one or more resource notification messages, indicates a bandwidth reduction recommendation for at least one LSP, of the one or more LSPs.

16. The non-ingress node of claim 15, wherein the at least one LSP is associated with a notification-requester stack, of the one or more notification-requester stacks, that is included in the resource notification message.

17. The non-ingress node of claim 13, wherein the one or more processors are further to:
receive, prior to identifying the resource issue event, a message, that originated from an ingress node that is associated with at least one LSP of the one or more LSPs, that includes resource notification request information;
identify a notification-requester stack included in the resource notification request information of the message; and
cause a data structure to store the notification-requester stack.

18. The method of claim 1, wherein the one or more notification-requester stacks are modified to include information of another node, at the top position of the one or more notification-requester stacks, based on the other node being a border node.

19. The non-transitory computer-readable medium of claim 7, wherein the notification-requester stack is modified to include information of another node, at the top position of the notification-requester stack, based on the other node being a border node.

20. The non-ingress node of claim 13, wherein the notification-requester stack is modified to include information of another node, at the top position of the notification-requester stack, based on the other node being a border node.

* * * * *